April 28, 1925.                                                                                    1,535,810
J. BREY
GLARE SCREEN
Filed Oct. 12, 1923
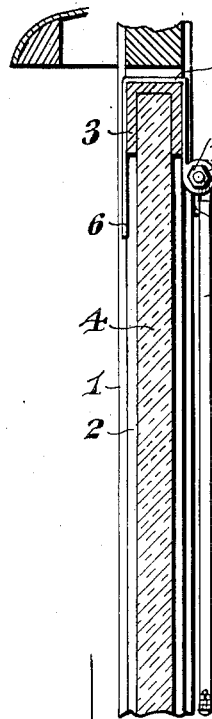
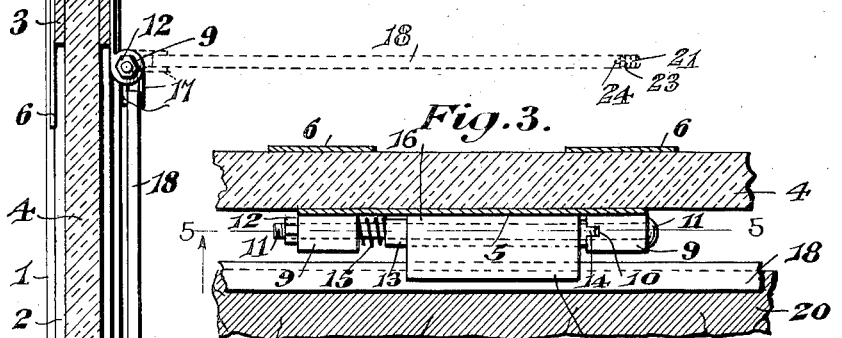
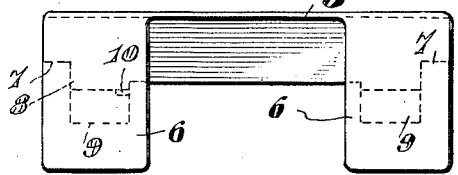
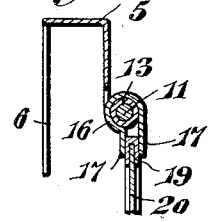
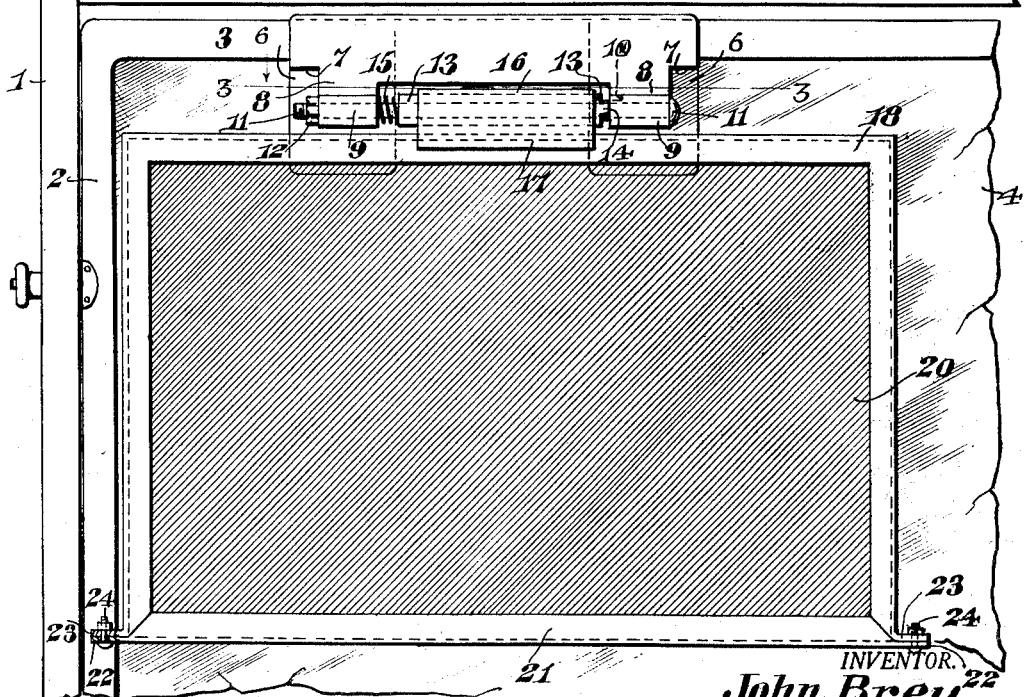
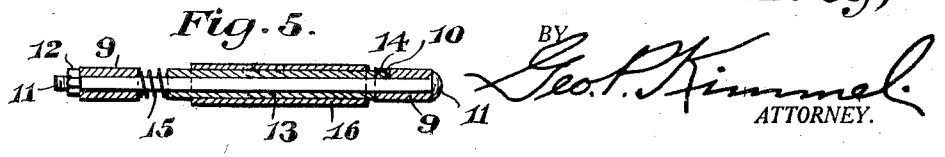
INVENTOR.
John Brey,
BY Geo. F. Kimmel
ATTORNEY.

Patented Apr. 28, 1925.

1,535,810

UNITED STATES PATENT OFFICE.

JOHN BREY, OF HANCOCK, MICHIGAN.

GLARE SCREEN.

Application filed October 12, 1923. Serial No. 668,153.

*To all whom it may concern:*

Be it known that I, JOHN BREY, a citizen of the United States, residing at Hancock, in the county of Houghton and State of Michigan, have invented certain new and useful Improvements in Glare Screens, of which the following is a specification.

This invention relates to auxiliary screen attachments for use upon the wind shield of an automobile, and has for its primary object the provision, in a manner as hereinafter set forth, of an adjustable screen or light filter so constructed and arranged that it may be quickly moved into position before the vision of the operator of the machine to which it is attached, to intercept harmful light rays thrown off by the headlights of an oncoming machine, thus avoiding possible injury to the eyes of the driver and preventing accidents attendant upon such injury.

A further object of the invention is the provision, in a manner as hereinafter set forth, of a glare screen of simple but sturdy construction, easily attached or detached from the wind shield of an automobile, neat and attractive in appearance, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claim.

In the drawings:—

Figure 1 shows an end elevation of a device embodying this invention, attached to a wind shield, the wind shield being in section.

Fig. 2 is a front elevation of the same.

Fig. 3 is a section taken on the line 3—3 of Fig. 2.

Fig. 4 is a vertical transverse section showing the wind shield engaging clip, the hinge and upper portion of the screen.

Fig. 5 is a section on the line 5—5 of Fig. 3, and

Fig. 6 is a detail of the wind shield engaging clip.

Referring now to the drawings in detail, wherein like numerals of reference indicate corresponding parts throughout the several views of the drawings, the wind shield support is indicated by the numeral 1, carrying therein the wind shield 2, of usual construction, comprising the frame 3 and the glass 4.

The device embodying this invention comprises an elongated substantially U-shaped clip member 5, one side of which is of greater height than the other and cut away at its central portion, thus forming the depending portions 6. The other side of the clip member is of less height, and is cut in at its ends as indicated at 7, the central portion of this side is also cut down, though not as deeply as the opposite side, forming the depending ears 8 the ends of which are rolled back to form the bearings 9. The inner edge of one of these bearings is provided with the notch 10, the purpose of which will be made apparent further on.

Extending through and from one bearing to the other is a bolt 11, secured in position by the nut 12, carried at its outer end. Loosely carried upon the bolt 11, between the bearings 9, is a sleeve 13, of less length than the distance from one bearing to the other, one end of which sleeve is provided with the finger 14 adapted to engage the notch 10. Between the opposite end of the sleeve and the bearing adjacent thereto a helical spring 15 is also mounted on the bolt 11.

Formed around and permanently secured to the sleeve 13 is a supporting member 16, of substantially the same length as the sleeve and having the edges spaced apart and extending a short distance below the sleeve to provide the spaced supporting arms 17 adapted to receive therebetween one side of an open frame member 18. The inner edge of this frame is provided with a groove 19 into which is adapted to be slid from the open side of the frame a glare screen 20 of green or amber glass or other appropriate material. The open side of the frame is closed by a member 21, also grooved along its inner edge to receive the edge of the screen 20, and having at its outer end aperture ears 22 adapted to abut corresponding ears 23 formed integral with and projecting laterally from the free end of the frame 18. Bolts 24 are provided to secure the two ears together.

In the operation of this device, the clip 5 is secured over the upper edge of the wind shield, the screen 6 being upon the inside of the wind shield, and hanging when in operative position, between the view of the driver and the road before the machine. When in this position, the finger 14 is out of engagement with the slot 10, the sleeve 13 being pushed to one side on the bolt 11 against the tension of the spring 15. When it is desired to remove the screen from the field of vision, the driver lifts the screen until it assumes a horizontal position whereupon the finger 14 becomes opposite the notch 10 whereupon the spring will force the sleeve over to cause an engagement between the finger and the notch. When it is desired to move the screen in position again to protect the eyes of the driver, it is only necessary to press the screen over against the tension of the spring whereupon the finger 14 will be disengaged from the notch 10 and the screen will drop into position.

What I claim is:—

A device of the class described comprising a clip device adapted to bear over the upper edges of a support and having spaced bearings, one of said bearings having a notch in its inner end with the sides thereof in parallel relation, a rod extending through said bearings, a sleeve slidable on said rod and having a projection with its sides in parallel relation and adapted to engage said notch, a spring operating to hold said sleeve with its projection yieldably engaged with said notch when in one position, and positively locking the sleeve to the bearing when in one position and releasable only by moving the sleeve longitudinally, and a member supported by said sleeve and rotatable therewith upon the rod.

In testimony whereof, I affix my signature hereto.

JOHN BREY.